(12) United States Patent
Farmer

(10) Patent No.: US 7,753,293 B2
(45) Date of Patent: Jul. 13, 2010

(54) BROADCAST SPREADER MECHANISM FOR AN ALL TERRAIN VEHICLE AND THE LIKE

(76) Inventor: Thomas E. Farmer, 1602 Biovu, Galveston, TX (US) 77551

( * ) Notice: Subject to any disclaimer, the term of this patent is extended or adjusted under 35 U.S.C. 154(b) by 144 days.

(21) Appl. No.: 12/321,015

(22) Filed: Dec. 11, 2007

(65) Prior Publication Data

US 2009/0114746 A1    May 7, 2009

Related U.S. Application Data

(60) Division of application No. 11/363,739, filed on Feb. 28, 2006, now Pat. No. 7,306,175, which is a continuation-in-part of application No. 10/941,208, filed on Sep. 15, 2004, now Pat. No. 7,607,595.

(51) Int. Cl.
*E01C 19/20* (2006.01)
(52) U.S. Cl. .................. 239/661; 239/650; 239/663; 239/666; 239/681; 239/687; 224/42.32; 111/11
(58) Field of Classification Search .......... 239/172, 239/650–689, 722; 111/11–13, 130–133; 224/42.32, 42.33, 274, 401, 402, 412
See application file for complete search history.

(56) References Cited

U.S. PATENT DOCUMENTS

| 649,953 | A | 5/1900 | Rinderknecht |
| 2,350,476 | A | 6/1944 | Richey |
| 2,442,743 | A | 6/1948 | Wester |
| 2,562,422 | A | 7/1951 | Herd |
| 2,717,783 | A | 9/1955 | Flink |
| 2,723,860 | A | 11/1955 | Weeks |
| 2,774,602 | A | 12/1956 | Sanderson |
| 2,856,191 | A | 10/1958 | Kolb |
| 2,886,334 | A | 5/1959 | Presler |
| 3,014,729 | A | 12/1961 | Henningsen et al. |
| 3,790,090 | A * | 2/1974 | Lorenc et al. ............... 239/666 |
| 3,815,824 | A * | 6/1974 | Olson ......................... 239/674 |
| 4,176,771 | A | 12/1979 | Dubroc, Sr. |
| 4,234,109 | A | 11/1980 | Goodhart |
| 4,382,568 | A | 5/1983 | Schertz |
| 4,402,438 | A | 9/1983 | Gregory |
| 4,685,619 | A * | 8/1987 | Harder et al. .................. 239/1 |
| 5,375,773 | A | 12/1994 | Lewis |
| 5,400,974 | A | 3/1995 | Musso et al. |
| 5,573,162 | A | 11/1996 | Spencer et al. |
| 5,820,035 | A | 10/1998 | Johnson et al. |
| 5,947,391 | A * | 9/1999 | Beck et al. .................. 239/677 |

(Continued)

OTHER PUBLICATIONS

Pictures A,B,C of broadcast feeders commerically-available from All Seasons Feeders of San Antonio,TX, Picture A dated Aug. 20, 2003, Picture B dated Feb. 5, 2004, Picture C dated Jun. 14, 2004.

(Continued)

*Primary Examiner*—Len Tran
*Assistant Examiner*—Jason J Boeckmann
(74) *Attorney, Agent, or Firm*—Gordon & Jacobson, PC

(57) ABSTRACT

A spreader accessory mountable below the extension rack of an ATV. In another aspect, an improved spreader mechanism that automatically starts and stops the feed of material from a storage container in conjunction with the distribution of material therefrom.

14 Claims, 4 Drawing Sheets

U.S. PATENT DOCUMENTS

| | | |
|---|---|---|
| 6,149,079 A | 11/2000 | Kinkead et al. |
| 6,179,180 B1 | 1/2001 | Walker |
| 6,220,532 B1 * | 4/2001 | Manon et al. ............... 239/672 |
| 6,321,611 B1 | 11/2001 | Szu et al. |
| 6,378,748 B1 | 4/2002 | Cox |
| 6,401,557 B1 | 6/2002 | Davies |
| 6,422,490 B1 | 7/2002 | Truan et al. |
| 6,502,728 B2 | 1/2003 | Savant |
| 6,502,771 B1 * | 1/2003 | Wyne ......................... 239/663 |
| 6,637,678 B2 | 10/2003 | Wyne |
| 6,659,566 B2 | 12/2003 | Bombardier |
| 6,698,997 B2 | 3/2004 | Arne et al. |
| 6,715,703 B2 | 4/2004 | Kost et al. |
| 6,907,832 B2 * | 6/2005 | Wyne ......................... 111/130 |
| 6,945,482 B2 * | 9/2005 | Hollinrake et al. .......... 239/672 |
| 2002/0175230 A1 | 11/2002 | Wyne |

OTHER PUBLICATIONS

Bumber Buddy ATV Spreader; Cabela's World's Foremost Outfitter; Internet Advertisement; www.cabelas.com; downloaded May 10, 2004.

* cited by examiner

BROADCAST SPREADER MECHANISM FOR AN ALL TERRAIN VEHICLE AND THE LIKE

This application is a divisional of U.S. patent application Ser. No. 11/363,739, filed on Feb. 28, 2006, and to be issued as U.S. Pat. No. 7,306,175, on Dec. 11, 2007, which is a continuation-in-part of U.S. patent application Ser. No. 10/941,208, filed on Sep. 15, 2004, now U.S. Pat. No. 7,607,595 herein incorporated by reference in their entireties.

BACKGROUND OF THE INVENTION

1. Field of the Invention

The invention relates generally to accessories that are mounted onto an all terrain vehicle (ATV) and the like, and more particularly to broadcast spreader mechanisms that that are mounted to ATVs and the like.

2. State of the Art

All terrain vehicles (ATVs) are popular as a mode of transportation, particularly for various types of off-road activities. Typically, an ATV is equipped with a factory installed (or other pre-existing) carrier rack. The carrier rack generally consists of a plurality of tubular members that are mounted to the frame of the ATV. The tubular members are arranged to form a horizontal support area and spaced apart in a manner that allows various items such as tents, guns, fishing poles, tackle boxes, other field equipment, to be removably attached thereto using rope, bungee cords and the like.

The rugged nature of the ATVs has also made it popular as a utility vehicle. For such purposes, it is cumbersome to repeatedly lash items to the factory-installed carrier racks. Thus, it has become popular to mount accessory extension racks onto such factory-installed carrier racks. The extension rack provides a flat storage bed that is useful for carrying diverse items and animals, such as containers, bags, gear, tools, dogs, etc. An example of such an extension rack is illustrated in U.S. Pat. No. 6,502,728 to Savant.

It is also known to mount a broadcast spreader accessory to the top of an ATV carrier rack. For example, an ATV-mounted spreader accessory known as the "Bumper-Buddy" is sold commercially. It includes a conical hopper (20-gallon/50-lb. capacity) that is mounted behind and above the ATV rear rack by bolt mount clamps. A spreader mechanism that includes an aluminum flow control valve, spinner plate and motor are supported underneath the conical hopper. The broadcast spreader accessory provides for distribution of large quantities of seed, corn, granulated salt, fertilizer and other dry pellet material.

While the Bubby-Buddy spreader is useful, it suffers from several drawbacks. For example, because the spreader accessory is mounted on the ATV carrier rack, an extension rack cannot also be mounted onto the carrier rack due to interference between the two accessories. In the event that a user desires the functionality provided by both of these accessories, the user must independently demount and alternatively mount the respective accessories onto the ATV carrier rack, which is cumbersome and time consuming. In addition, because the Bumper Buddy spreader is mounted above the ATV carrier rack, it significantly obstructs rear vision, obstructs normal access and use of the rear rack, and also undesirably moves the center of gravity of the ATV so that the ATV is more prone to roll-over.

Moreover, commercially available broadcast spreaders typically employ a sliding gate mechanism to start and stop the feed of material for distribution. Such mechanisms are prone to leakage and/or jamming. Such failures cause material to spill wastefully and, in the case of fertilizers, pesticides, herbicides and the like, such excess amounts can cause crop and/or lawn damage.

Automatic feed and distribution mechanisms have been developed that are less prone to leakage and jamming. An example is described in U.S. Pat. No. 5,820,035 to Johnson, which employs a disc that is operably coupled via a rotating shaft to an electric motor. When the motor is powered on, the rotating shaft rotates, thereby driving rotation of the disc. The rotating shaft and disc incorporate a helical thread interface together with a return spring and stop mechanism. When the rotating shaft is not moving, the return spring biases the disc to remain in a closed position that prohibits distribution of material from a storage hopper. When the rotating shaft is initially rotated, the disc moves down the rotating shaft to an open position to allow for distribution of material from the storage hopper. In its open position, material exits the storage hopper and is distributed by rotation of the disc. This mechanism works well in automatically starting and stopping the feed of material from the storage hopper, but it is difficult to adjust the feed rate for a given size material and/or to adjust the feed rate for different size materials. Because of these limitations, the distribution mechanism is difficult to use with different size seeds or pellets and thus is used primarily for static feeding and distribution of feed for fish and game.

SUMMARY OF THE INVENTION

It is therefore an object of the invention to provide a spreader accessory mountable to an extension rack of an ATV and the like that provides a spreader mechanism suitable for storage and distribution of large quantities of dry pellet material (e.g., seeds, fertilizer, pellets or other granular material).

It is another object of the invention to provide such a spreader accessory for an ATV and the like that permits carrying a wide variety of diverse loads and simultaneously storing and distributing large quantities of dry pellet material, thus avoiding the need to switch between accessories.

It is a further object of the invention to provide such a spreader accessory for an ATV and the like that provides the operator with an unobstructed view while operating the ATV.

It is another object of the invention to provide such a spreader accessory for an ATV and the like that provides the operator with unobstructed normal access and use of an extension rack.

It is also an object of the invention to provide such a spreader accessory for an ATV that is easily adjustable for a wide range of dry pellet material and that is easily adjustable for a wide range of distribution rates.

It is yet another object of the invention to provide such a spreader accessory for an ATV and the like that need not be removed when not being used.

It is also an object of the invention to provide such a spreader accessory for an ATV and the like that lowers the center of gravity of the vehicle, thereby enhancing stability and making the vehicle more resistant to rollover.

In accord with these objects, which will be discussed in detail below, an accessory is provided that is mountable to the extension rack of an ATV and the like. The extension rack provides a substantially flat storage bed. The accessory is capable of storing and distributing granular material therefrom. The accessory is supported in a position below the extension rack. In the preferred embodiment, the accessory includes a hopper that extends rearward beyond the extension rack with a door that extends rearward beyond the extension rack for easy loading and cleaning.

It will be appreciated that the ATV accessory of the present invention is positioned completely out of the way of the user and can be left in place. This feature enables the operator to avoid the time required to switch between accessories. It also provides the operator with an unobstructed view while operating the ATV together with unobstructed normal access and use of the extension rack. In addition, supporting the accessory beneath the extension rack lowers the center of gravity of the vehicle, thereby enhancing stability and making the vehicle a bit more resistant to rollover.

In another aspect of the present invention, a broadcast spreader mechanism for distributing granulated material employs a container with an outlet port together with a housing having a first housing part and a second housing part. The first housing part is mounted beneath and aligned to the outlet port of the container. The second housing part supports a threaded shaft, a spinner plate mounted on the threaded shaft with a coupler provided with internal threads that interface to the threaded shaft, a power source that rotationally drives the threaded shaft causing the spinner plate to rotate and travel along the threaded shaft, and a return spring encircling the threaded shaft and disposed between the spinner plate and the power source. The spinner plate is disposed beneath and aligned to the outlet port of the container for distribution of granulated material therefrom. The second housing part is moveably fixed relative to said first housing part in order to adjust amount of travel of the spinner plate along the threaded shaft. In the preferred embodiment, the first housing part includes an opening and funnel section for receiving the outlet port of the container, and a spring stop is used that encircles the threaded shaft and engages the return spring together with means for fixably moving the spring stop along the threaded shaft. A clamp can be used to clamp the return spring to a user-selected portion of the spring stop.

It will be appreciated that the broadcast spreader mechanism of the present invention enabled the user to quickly and easily select an appropriate feed rate over a wide range of feed rates and thus allow the spreader mechanism to be used effectively for a broad range of products with varying size and weight.

According to the preferred embodiment, the first housing part (or the second housing part or both) employ slots and wing nut connections therethrough that provide for fixable movement of the second housing part relative to the first housing part.

Additional objects and advantages of the invention will become apparent to those skilled in the art upon reference to the detailed-description taken in conjunction with the provided figures.

DETAILED DESCRIPTION OF THE PREFERRED EMBODIMENTS

Figure 1:
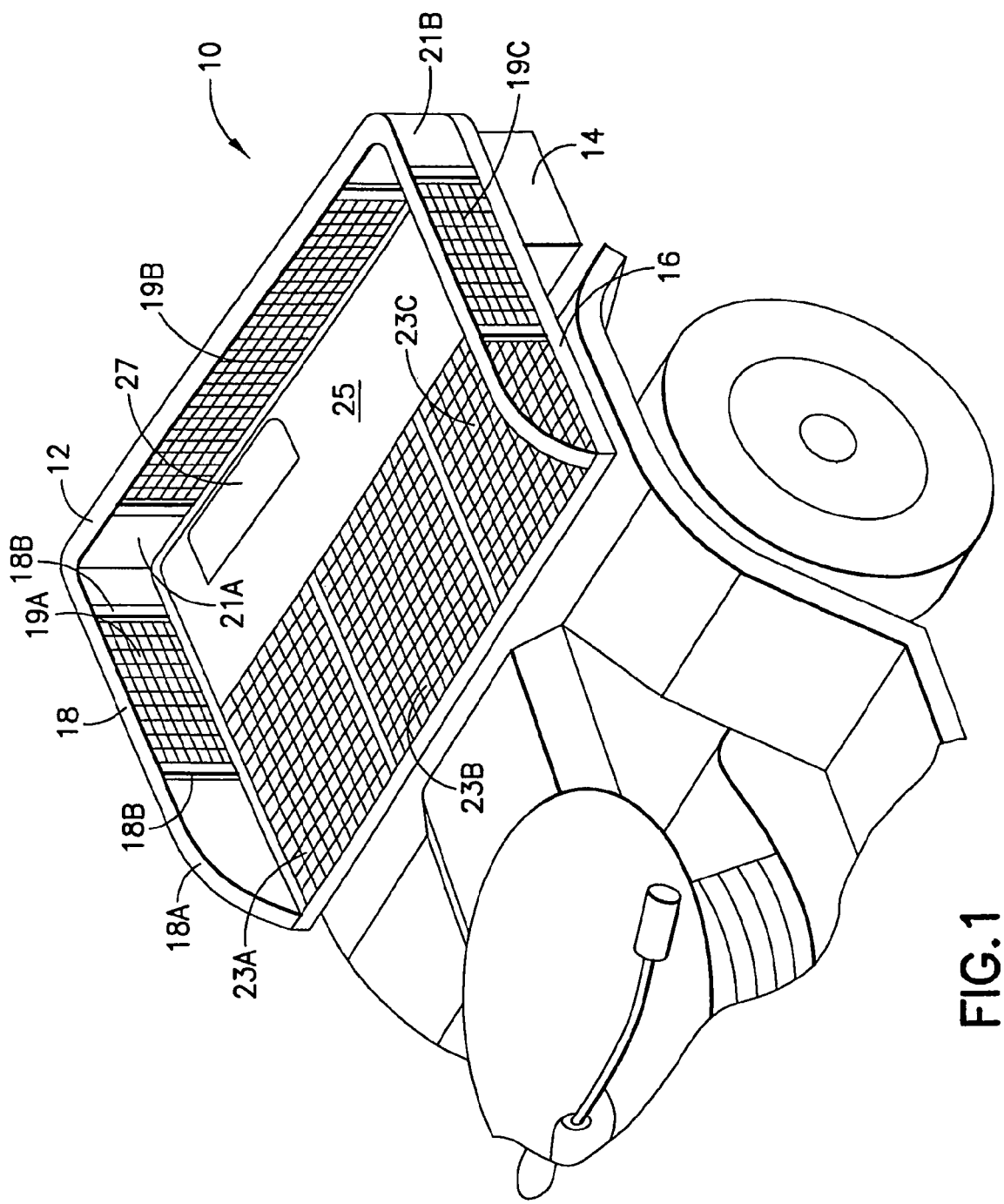
FIG. 1 is an isometric view of an illustrative embodiment of a multipurpose accessory for an ATV in accordance with the present invention.

Turning now to FIG. 1, there is shown an ATV accessory 10 in accordance with the present invention. The ATV has a factory-installed (or other pre-existing) carrier rack that is affixed to its frame. The carrier rack, which is also referred to as a rear rack herein, includes a plurality of tubular members that provide a horizontal support area above the rear fenders of the ATV as is conventional. The rear rack is hidden in FIG. 1 and thus not shown. An extension rack 12 is mounted to the rear rack. The extension rack 12 provides a flat storage bed that is useful for carrying diverse items and animals, such as containers, bags, gear, tools, dogs, etc. The extension rack 12 includes a base frame 16 and a side frame 18 both constructed from tubular members. The base frame substantially extends in the horizontal plane and is attached to the pre-existing rear rack utilizing bolted-collars, spring-clips, brackets, or other suitable fastening mechanisms. The side rail frame 18 is vertically displaced from the base frame 16 and preferably includes a rail 18A, vertical supports 18B, metal mesh sections 19A, 19B, 19C and metal sheet sections 21A, 21B. Similarly, the base frame 16 is preferably covered with metal mesh sections 23A, 23B, 23C and metal sheet section 25. In this manner, the covered base frame and side rail frame provide a flat storage bed that is suitable for carrying a wide range of diverse items.

Figure 2:
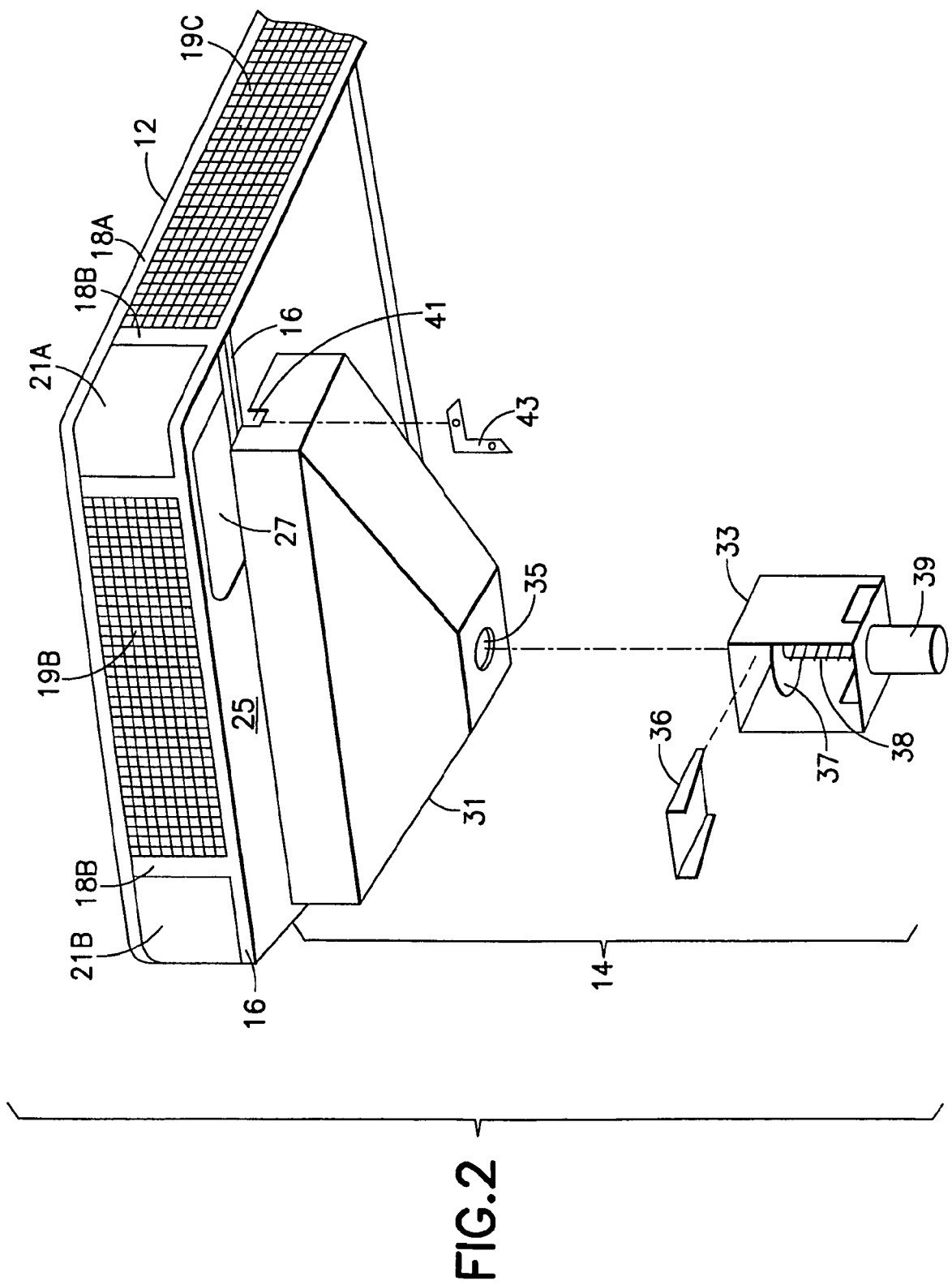
FIG. 2 is an exploded view of the multipurpose accessory of FIG. 1 in accordance with the present invention.

In accordance with the present invention, a spreader assembly 14 is provided that is affixed in position below the extension rack 12. A door 27 is provided through the metal sheet 25 towards the rear of the extension rack 12 as shown in FIGS. 1 and 2. The door 27 provides a passageway to the spreader assembly 14 that is disposed below the extension rack 12.

The spreader assembly 14 includes a gravity-feed hopper 31 and a dispensing mechanism 33 mounted thereunder. The hopper 31 is filled by loading material (e.g., seed, fertilizer, granulated lime, granulated salt, etc) through the door 27 and empties via outlet 35. The dispensing mechanism 33 includes a spring-loaded gate 36 that slides relative to the outlet 35 to selectively control the flow rate of material exiting the outlet 35. The position of the gate 36 is preferably controlled by pulling a wire/cable (not shown) to thereby open and close the gate. The dispensing system 33 also includes a spinner plate 37 that is operably coupled via rotating shaft 38 to an electric motor 39. When the motor 39 is powered on, the rotating shaft 38 rotates, thereby driving rotation of the spinner plate 37. When the spinner plate 37 rotates, material that exits the outlet 35 is distributed over a large area behind the spreader. Push button control can be used to selectively power the electrical motor on and off and thereby provide user control over distribution by the spinner plate. Alternatively, the dispensing mechanism 33 may include a motor-driven closure mechanism as described below or possibly the motor-driven closure mechanism described in U.S. Pat. No. 5,820,035, herein incorporated by reference in its entirety.

The hopper 31 may include slots 41 in its structure that conform to the geometry of the base frame structure 16 of the extension rack 12 as shown in FIG. 2. These slots enable the top of the hopper 31 to mount flushly to the underside of the extension rack 12. The spreader assembly 14 is preferably mounted below the extension rack 12 by L-shaped brackets 43 (one shown) and bolts that join the hopper 31 to the base frame structure 16 as shown in FIG. 2. Alternatively, the hopper 31 (and spreader assembly 14) may be permanently affixed to the extension rack 12 by welding or other means.

Figure 3:
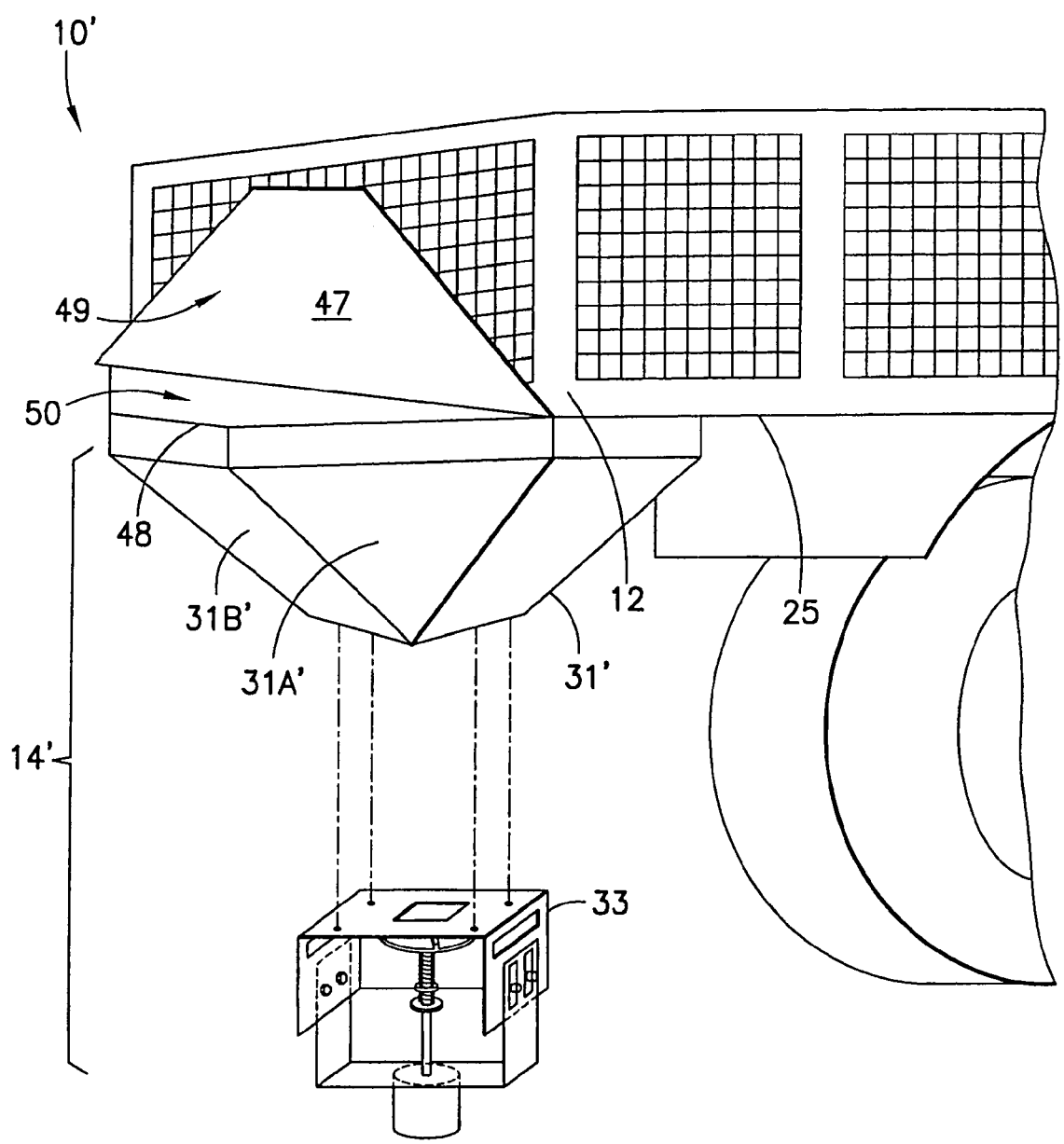
FIG. 3 is an exploded view of a spreader accessory for an ATV in accordance with the present invention.

An alternate embodiment of a spreader assembly 14' in accordance with the present invention is shown in FIG. 3. In this alternate embodiment, the front portion of the hopper 31' is affixed to the underside of the extension rack 12 by bolts, brackets, or other suitable fastening mechanisms (not shown). The rear portion of the hopper 31' is realized by sidewalls that extend rearward beyond the rear of the extension rack 12. In the illustrative embodiment shown, the rear portion of the hopper 31' includes three angled sidewalls (two shown in the view of FIG. 3 as 31A', 31B') that extend rearward beyond the rear of the extension rack 12. A door 47 is disposed on the top of the hopper 31'. The door 47 extends rearward beyond the rear of the extension rack 12. Preferably, the hinged portion of the door 47 extends along the major dimension of the hopper 31', and the opposite edge of the door 47 interfaces to the rim 48 formed by the rearward projecting angled sidewalls of the hopper 31' as shown. The door 47 is opened (depicted by arrow 49) to gain access into the interior of the hopper 31'. Material that is to be distributed by operation of the spreader assembly 14' is loaded through the open door 47 (depicted by arrow 50). A dispensing mechanism 33' is mounted below the hopper 31' preferably by four bolts as depicted by the dotted lines of the exploded view. The embodiment of FIG. 3 is advantageous because it can readily be mounted onto an existing rack 12 without significant modification (e.g., cutting an access door through the floor of the extension rack 12).

Figure 4:
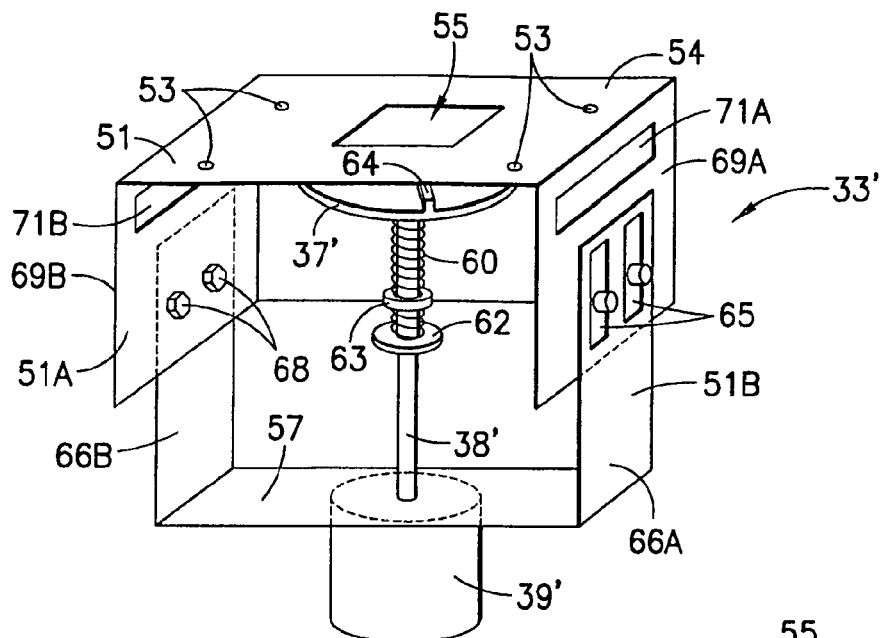
FIG. 4 is an isometric view of the dispensing mechanism employed by the spreader accessory of FIG. 3.
Figure 5:
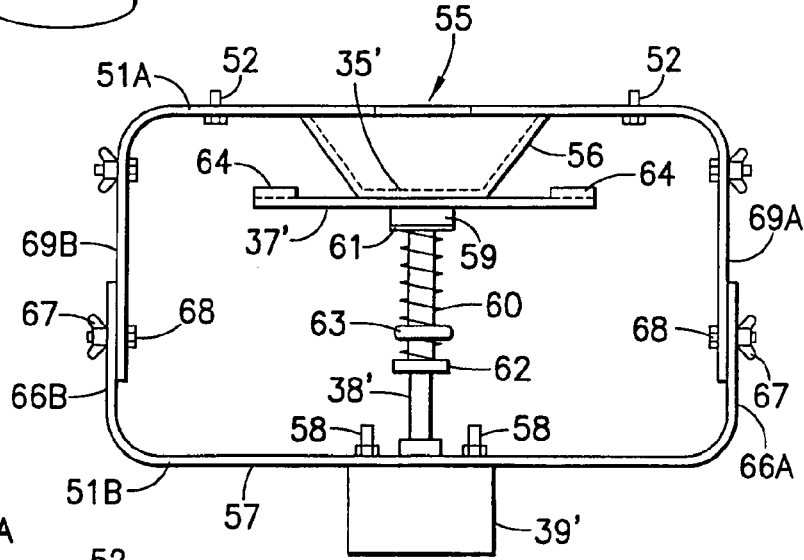
FIG. 5 is a schematic rear view of the dispensing mechanism of FIG. 4.
Figure 6:
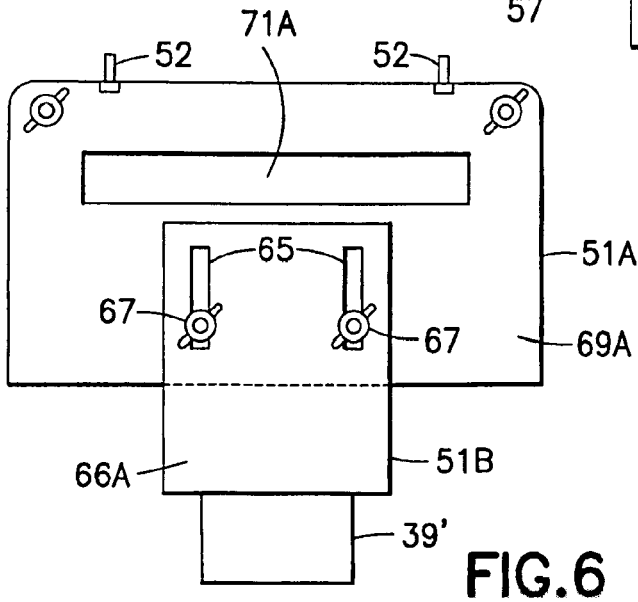
FIG. 6 is a schematic side view of the dispensing mechanism of FIG. 4.

As shown in FIGS. 4-6, the dispensing mechanism 33' includes a housing 51 with two parts (51A, 51B) that are mounted below the hopper 31'. The first housing part 51A is mounted to the bottom side of the hopper 31' preferably by four bolts 52 that pass through four corresponding thru-holes 53 in its top wall 54. The top wall 54 also has an opening 55 that leads to a funnel section 56, which are adapted to receive the outlet 35' of the hopper 31' as best shown in FIG. 5. The second housing part 51B is mounted to the first housing part 51A in a manner that allows the second housing part 51B to be fixably moved vertically relative to the first housing part 51A.

An electric motor 39' is mounted below the bottom wall 57 of the second housing part 51B preferably by bolts 58. The electric motor 39' drives a rotating shaft 38' when powered on. The shaft 38' has a helical thread (not shown). A spinner plate 37' has a central opening with an internal threaded coupling 59 that mates with the helical thread of the shaft 38'. A return spring 60 surrounds the rotating shaft 38' and is disposed between the spinner plate 37' and the electric motor 39'. Preferably, a washer 61 or other suitable friction reducing member such as a bearing or like means is disposed between the top end of the return spring 60 and the bottom side of the coupling 59 of the spinner plate 37'. The lower end of the return spring 60 is positioned along the rotating shaft 38' by a spring stop 62. The user can manually adjust the position of the spring stop 62 along the rotating shaft 38' by unscrewing and screwing one or more set screws (not shown) that engage the rotating shaft 38' as is well known in the mechanical arts. In this manner, the user can adjust the position of the lower end of the return spring 60 along the rotating shaft 38'.

A hose clamp 63 or other like member encircles the return spring 60 over a portion of the spring stop 62. The return spring 60 and/or hose clamp 63 can be moved up or down the spring stop 62 and the hose clamp 63 tightened by the user such that the return spring 60 is clamped to a user-selected portion of the spring stop 62. In this manner, the user can i) adjust the position of the lower end of the return spring 60 along the rotating shaft 38', ii) adjust the effective length of the return spring 60, and iii) adjust the spring force applied by the return spring 60. In the preferred embodiment, the spring stop 62 extends along the helical thread of the rotating shaft 38' over a total length of 1-2 inches. The return spring 60 and/or hose clamp 63 can be moved up or down this 1-2 inch length of spring stop and the hose clamp 63 tightened such that the return spring 60 is clamped thereto. This configuration advantageously provides a wide range of adjustability for i) the position of the lower end of the return spring 60 along the rotating shaft 38', ii) the effective length of the return spring 60, and iii) the spring force applied by the return spring 60.

The top surface of the spinner plate 37' preferably includes a set of projections 64 at its periphery that throw material from the spinner plate 37' as it rotates. When the shaft 38' is not rotating, the return spring 60 biases the spinner plate 37' in a closed position against the funnel section 56, thereby preventing material from flowing out of the outlet 35' of the hopper 31' onto the spinner plate 37'. As the shaft 38' is initially rotated by powering up the electric motor 39', the spinner plate 37' rotates and moves down the helical thread of the rotating shaft. The downward movement of the spinner plate 37' continues to a stopping point where the spinner plate 37' rotates at the rotational speed of the shaft 38'. When the shaft 38' slows down and stops rotating by powering down the electric motor 39', the centrifugal force of the rotating spinner plate 37' and the return spring 60 cause the spinner plate 37' to move back up the rotating shaft 38' to its initial closed position against the funnel section 56, In this closed position, the return spring 60 biases the spinner plate 37' against the funnel section 56, thereby preventing material from flowing out of the outlet 35' of the hopper 31' onto the spinner plate 37'. Push button control can be used to selectively power the electrical motor 39' on and off and thereby provide user control over distribution by the spinner plate 37'.

The stopping point of the downward travel of the spinner plate 37' dictates the open position of the spinner plate 37'. The offset distance of the spinner plate 37' between its initial closed position and its open position controls the feed rate of the material that flows out of the outlet 35' of the hopper 31' onto the spinner plate 37' for distribution therefrom. The user adjusts this offset distance and thus controls the feed rate of the dispensing mechanism 33' by raising or lowering position of the lower housing part 51B relative to the upper housing part 51A. In conjunction with the position adjustment of the lower housing part 51B, the user may also adjust the position of the lower end of the return spring 60 along the rotating shaft 38' by moving the spring stop 62. The user can also move the return spring 60 and/or the hose clamp 63 up or down the spring stop 62 and tighten the clamp 63 to a user-selected portion of the spring stop 62 to i) adjust the position of the lower end of the return spring 60 along the rotating shaft 38', ii) adjust the effective length of the return spring 60, and iii) adjust the spring force applied by the return spring 60. Advantageously, such adjustments enable the user to quickly and easily select an appropriate offset distance/feed rate over a wide range and thus allow the dispensing mechanism 33' to be used effectively for a broad range of products with varying size and weight.

Note that in certain configurations, the natural length of the return spring 60 is insufficient to counteract the weight of the feed material against the spinner plate 37' and frictional forces and thus cannot produce the required spring forces to close the opening between the spinner plate 37' and the outlet 35' of the hopper 31' when the rotation of the shaft is stopped (i.e., the electric motor 39' is powered OFF). In such configurations, the user can move the return spring 60 and/or the hose clamp 63 up the spring stop 62 and tighten the clamp 63 to thereby decrease the effective length of the return spring 60 and increase the spring force applied by the return spring 60 such that the "clamped" return spring 60 produces the spring forces required to close this opening. Such adjustments are particularly useful to provide a wide gap opening for large-sized granular material or seed and/or fast distribution rates.

In the preferred embodiment, the raising and lower of the second housing part 51B relative to the first housing part 51A is provided by a set of vertical slots 65 in the opposing sidewalls 66A, 66B of the lower housing part 51B. FIGS. 4 and 6 show, for example, two vertical slots 65 in the sidewall 66A. Two additional vertical slots (not shown) are provided in the opposing sidewall 66B of the lower housing part 51B. The vertical orientation of the slots 65 ensure that they extend in a direction parallel to the rotating shaft 38'. External wing nuts 67 interface to bolts 68 that pass through the sidewalls 69A, 69B of the first housing part 51A and through the vertical slots 65 in the corresponding sidewalls 66A, 66B of the second housing part 51B. With the wing nuts 67 loosened, the vertical slots 65 allow the user to raise or lower the second housing part 51B relative to the first housing part 51A. With the two housing parts positioned as desired, the user tightens the wing nuts 67 to fix the position of the two housing parts 51A, 51B. This functionality can also readily be obtained by employing similar vertical slots in the first housing part 51A with external wing nuts that interface to bolts that pass through the sidewalls 66A, 66B of the second housing part 51B, or by employing aligned vertical slots in both housing parts 51A, 51B with external wing nuts that interface to bolts that pass through the aligned vertical slots. Other quick-operating fasteners can be used as a substitute for the wing nuts 67 and bolts 68 for fixing the relative distance between the first and second housing parts 51A, 51B. Such alternative quick-operating fasteners include lever-actuated devices, other turn-operated devices, slide-action devices, push-pull devices, lift-and-turn devices, and spring-loaded devices.

The first housing part 51A also preferably includes two lateral slots 71A, 71B that are formed in the sidewalls 69A, 69B of the first housing part 51A. The slots 71A, 71B allow for distribution of material therethrough as the material is thrown radially by the spinner plate 37'. The slots 71A, 71B can be covered by slidable members (e.g., slotted metal pieces) that are movable by the user along the lengthwise dimensions of the respective slots 71A, 71B to block user-selected portions of the slots 71A, 71B. Wing nut fasteners 73A, 73B (or other suitable quick-operating fasteners) may be used to fix the slidable covers at user-selected positions along the lengthwise dimensions of the respective slots 71A, 71B. In this manner, the user-selected positioning of the slidable members that cover the slots 71A, 71B enables the user to vary the distribution pattern of the material that is thrown radially by the spinner plate 37'.

It will be appreciated that ATVs typically include a rear hitch point that is used to removably couple a trailer thereto. The dispensing mechanisms described herein are preferably located above the horizontal plane of the rear hitch point such that it does not interfere with the use of the rear hitch point.

The ATV accessory of the present invention has many advantages. Because the hopper and dispensing apparatus are operably disposed under the extension rack 12 and completely out of the way of the user, they may be left in place. This feature enables the operator to avoid the time required to switch between accessories. It also provides the operator with an unobstructed view while operating the ATV together with unobstructed normal access and use of the extension rack. In addition, supporting the spreader accessory beneath the deck of the extension rack 12 lowers the center of gravity of the vehicle, thereby enhancing stability and making the vehicle a bit more resistant to rollover.

There have been described and illustrated herein embodiments of a multipurpose accessory for an all terrain vehicle. While particular embodiments of the invention have been described, it is not intended that the invention be limited thereto, as it is intended that the invention be as broad in scope as the art will allow and that the specification be read likewise. Thus, while particular hopper and dispensing mechanisms have been disclosed, it will be appreciated that other hopper and dispensing mechanisms can be used as well. For example, and not by way of limitation, the hopper and possibly the dispensing mechanism (or parts thereof) may be partitioned into multiple sections (e.g., with baffle(s)) in a manner that allows mixing of seeds and/or fertilizer of varying size and weight to be distributed simultaneously at the desired rate of dispersion. In another example, the hopper (and/or dispensing mechanism) can be designed to slide in and out of position below the extension rack utilizing, for example, a rail system. To load material into the hopper, the hopper would be slid out to allow the material to be poured into the hopper. After loading, the hopper is slid into position under the extension rack and secured for normal operation. Alternatively, one or more doors may be provided at (or near) the top of the side(s) of the hopper which are opened to load material into the hopper. In these configurations, the door through the floor of the extension rack may be omitted, and the hopper and dispensing mechanism can be readily adapted to be mounted under pre-existing extension racks by attachment to the extension rack, by attachment to the ATV frame or by other suitable means. Moreover, while particular configurations have been disclosed in reference to extension rack and mechanism for mounting the extension rack to the rear carrier rack of the all terrain vehicle, it will be appreciated that other configurations could be used as well. For example, the hopper and dispensing mechanism may be integrated with extension racks that have different sizes and shapes as those described herein. For example, a multi-level extension rack and/or an extension rack that extends down below the pre-existing rack cargo area may be used. In another example, the extension rack and the dispensing mechanism mounted therebelow may be integrated into a front carrier rack of the ATV. In yet another example, the hopper and spreader assembly of the present invention may be adapted to mount to commercially available ATV extension racks. It will therefore be appreciated by those skilled in the art that yet other modifications could be made to the provided invention without deviating from its spirit and scope as claimed.

What is claimed is:

1. An apparatus for use with an ATV having an extension rack providing a storage bed having a generally planar support surface with a top side opposite a bottom side and sidewalls that extend upward from the support surface, the extension rack mounted in a position above the rear tires of the ATV and extending rearward beyond the rear tires of the ATV, the apparatus comprising:

a spreader assembly adapted to store and distribute granular material therefrom, said spreader assembly having a hopper separate and distinct from the extension rack, and a dispensing mechanism with a motor, said hopper for bulk storage of granular material therein and said dispensing mechanism for distributing granular material stored in said hopper, said hopper having a top surface defining the upper boundary of said hopper spaced from an outlet port defining the lower boundary of said hopper, the outlet port leading to said dispensing mechanism; and mounting means for attaching said hopper to the bottom side of the generally planar support surface of the extension rack such that at least a portion of said top surface of said hopper is positioned adjacent to and under the bottom side of the generally planar support surface of the extension rack whereby said spreader assembly is supported by the extension rack and said hopper stores granular material under the extension rack;

wherein said hopper has angled sidewalls that extend rearward beyond said extension rack as well as a hinged door disposed rearward beyond said extension rack, the hinged door having a hinged side opposite a second side, and the angled sidewalls forming a top rim that interfaces to the second side of the hinged door.

2. An apparatus according to claim 1, wherein:
said mounting means comprise a plurality of bolt connections.

3. An apparatus according to claim 1, wherein:
said mounting means comprise a plurality of bracket connections.

4. An apparatus according to claim 1, wherein:
said dispensing mechanism comprises a spinner plate that is driven by said motor.

5. An apparatus according to claim 1, wherein:
said granulated material is selected from the group comprising seeds, fertilizer, granulated lime, granulated salt, other dry pellet material.

6. An apparatus according to claim 1, wherein:
said hopper and said mounting means are configured such that at least a portion of said hopper is disposed under said extension rack.

7. An apparatus according to claim 1, wherein:
said spreader assembly has a flow control mechanism to selectively control flow rate of material exiting said outlet port of said hopper.

8. An apparatus according to claim 7, wherein:
said flow control mechanism is part of said dispensing mechanism.

9. An apparatus according to claim 8, wherein:
said flow control mechanism comprises a spring-loaded gate.

10. An apparatus according to claim 1, further comprising:
means for mounting said dispensing mechanism to said hopper such that said dispensing mechanism is positioned under said hopper.

11. An apparatus for use with an ATV comprising:
an extension rack providing a storage bed having a generally planar support surface with a top side opposite a bottom side and sidewalls that extend upward from said support surface, said extension rack mounted in a position above the rear tires of the ATV and extending rearward beyond the rear tires of the ATV;

a spreader assembly adapted to store and distribute granular material therefrom, said spreader assembly having a hopper separate and distinct from said extension rack, and a dispensing mechanism with a motor, said hopper for bulk storage of granular material therein and said dispensing mechanism for distributing granular material stored in said hopper, said hopper having a top surface defining the upper boundary of said hopper spaced from an outlet port defining the lower boundary of said hopper, the outlet port leading to said dispensing mechanism; and mounting means for attaching said hopper to the bottom side of the generally planar support surface of said extension rack such that at least a portion of said top surface of said hopper is positioned adjacent to and under the bottom side of the generally planar support surface of said extension rack whereby said spreader assembly is supported by said extension rack and said hopper stores granular material under said extension rack;

wherein said hopper has angled sidewalls that extend rearward beyond said extension rack as well as a hinged door disposed rearward beyond said extension rack, the hinged door having a hinged side opposite a second side, and the angled sidewalls forming a top rim that interfaces to the second side of the hinged door.

12. An apparatus according to claim 11, wherein:
said mounting means comprise a plurality of bolt connections.

13. An apparatus according to claim 11, wherein:
said mounting means comprise a plurality of bracket connections.

14. An apparatus according to claim 11, wherein:
said dispensing mechanism comprises a spinner plate that is driven by said motor.

* * * * *